United States Patent [19]

Schiffman

[11] 3,906,384

[45] Sept. 16, 1975

[54] SYSTEM FOR NULLIFYING SIGNAL PROCESSOR DISTORTIONS

[75] Inventor: Murray M. Schiffman, Westport, Conn.

[73] Assignees: Cambridge Research and Development Group, Westport, Conn.; Sanford D. Greenberg, Washington, D.C.; DT Liquidating Partnership, New York, N.Y.; Murray M. Schiffman, Westport, Conn.

[22] Filed: Feb. 12, 1973

[21] Appl. No.: 331,576

[52] U.S. Cl. .................. 328/165; 328/162; 330/149

[51] Int. Cl.$^2$ .................. H03B 1/00

[58] Field of Search ...... 328/162, 165, 139; 325/65, 325/475, 476; 330/149, 150

[56] References Cited

UNITED STATES PATENTS

| | | | |
|---|---|---|---|
| 2,183,731 | 12/1939 | Wright | 330/149 |
| 3,202,928 | 8/1965 | Prior | 330/149 X |
| 3,213,450 | 10/1965 | Goor | 325/475 |
| 3,254,233 | 5/1966 | Kobayashi et al. | 328/162 X |
| 3,327,227 | 6/1967 | Sykes et al. | 328/139 |
| 3,480,867 | 11/1969 | Sichak | 325/476 |
| 3,611,145 | 10/1971 | O'Connor | 325/65 |

*Primary Examiner*—Michael J. Lynch
*Assistant Examiner*—B. P. Davis
*Attorney, Agent, or Firm*—Charles E. Pfund, Esq.

[57] ABSTRACT

A system for nullifying characteristic disturbances introduced into an analog information signal passing through a multiple stage signal processor which is varied in one or more parameters, such as an analog shift register whose shift rate is repetetively varied and recycled between two rates. In one embodiment, an inverter is placed midway through the register so that the characteristic distortions effected in the signal during transmission through the first half of the stages are self-canceled through the remaining half while the signal, though inverted, is transmitted. In another embodiment of the invention, the signal and its inverse are fed respectively through two full length (N-stage) registers, the outputs of which are connected respectively to the inverting and non-inverting inputs of a summing circuit. Since the signal applied to one of these inputs as well as one of the register output signals are inverted, the summed information signal is provided at twice the unsummed amplitude and with a nullification of the characteristic distortions effected by processing through the register. In a modification of the second embodiment, the signal and its inverse are alternately sampled and fed respectively through each of two half-length registers (N/2 stages) (which are thus equivalent respectively to the odd and even stages of a single register), one of the outputs of which is inverted before being applied alternately with the non-inverted other output to the summing amplifier, thus yielding a full composite signal of normal amplitude and also a sequential sample-by-sample nullification of said characteristic distortions.

9 Claims, 8 Drawing Figures

(NOTE: $C_O$, 19, AND $C_E$, 20, ARE ALTERNATE OUT-OF-PHASE SIGNAL SAMPLES)

SYSTEM FOR NULLIFYING SIGNAL PROCESSOR DISTORTIONS

BACKGROUND OF THE INVENTION

When an information-representing signal is passed through signal processing components, undesirable characteristic perturbations, or distortions, may be introduced into the signal as it is being operated upon. The resulting distortions may be sufficient to alter the information represented by the signal or, in the case of an audio signal, seriously interfere with the speech or music being transmitted. Filtering, common-mode rejection techniques, and other means have conventionally been employed to eliminate or reduce these distortions.

In certain cases, these techniques may be inadequate or too costly as, for example, where the distortion introduced into the signal is a characteristic which intermodulates itself while the signal is being transmitted through the processing components.

OBJECTS AND SUMMARY OF THE INVENTION

It is thus a general object of this invention to provide a system for nullifying characteristic distortions introduced in a signal while being transmitted through signal processing components.

It is a further object to provide such a system which nullifies such distortions where the distortions are characteristics which intermodulate themselves as the signal is being transmitted.

It is a further object to provide such a signal distortion nullifying system which requires only the use of easily available components.

It is an additional object to provide such a system which is particularly suitable for signal processing components which comprise integrated circuits.

These and other objects are achieved with the invention where the characteristic distortions produced in a signal passing through a plurality of processing components are eliminated by inverting the signal after it is fed through about one-half of the components and combining the inverted signal with the signal passing through the other half of the components. In one embodiment of the invention, an inverter is provided midway between a plurality of successive serially connected processing components so that the distortions caused by those components at the beginning of the series are nullified by corresponding distortions produced by those components at the end of the series. In another embodiment of the invention, the signal is fed to a first plurality of processing components, its inverse is fed to a second plurality of such processing components. The outputs of the first and second pluralities of processing components are applied to respective inputs of an output circuit which inverts one of the applied outputs and sums them such that the respective distortions introduced by the first and second pluralities of processing components cancel while the signal portions are additive, yielding a double amplitude signal with minimal processing distortions. The output circuit may comprise a difference amplifier with the signal transmitted through one of the pluralities of processing components, thus being inverted. Alternatively, a summing amplifier with an inverter connected to one of its inputs may be substituted for said difference amplifier. In still another embodiment, the signal and its inverse are alternately exclusively sampled and fed respectively through a first and a second half-length plurality of said processing components. The outputs of the first and second pluralities of processing components are alternately exclusively applied to respective inputs of an output circuit which inverts one of the applied outputs and sums them such that the respective distortions introduced by said first and second half-length pluralities alternately negate one another, so that the characteristic distortion effects may be canceled by suitable low pass filtering, while the signal portions are alternately presented, thus yielding effectively a full uninterrupted composite signal with minimal characteristic processing distortions.

DESCRIPTION OF THE PREFERRED EMBODIMENTS

Figure 1:
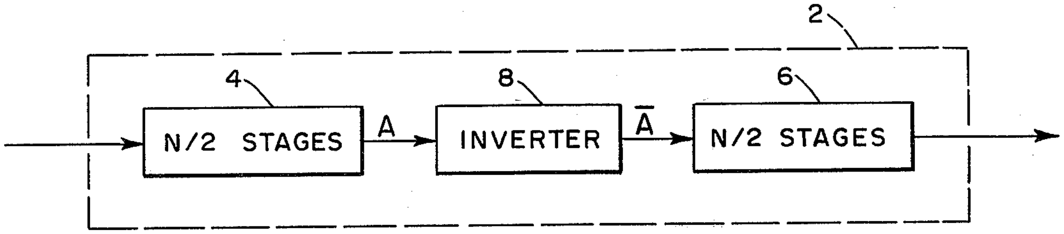
FIG. 1 is a block diagram of a preferred embodiment of the invention.

FIG. 1 diagrammatically illustrates an analog shift register 2 having an even number N of substantially identical stages. As illustrated, the register 2 is made of N/2 stages at its input end designated 4 and N/2 stages designated 6 at its output end. Generally, in the prior art, the input stages 4 and output stages 6 are connected together in sequence and any analog information signal being processed and switched through the register receives perturbations or distortions caused by such transfer. The introduced distortion may intermodulate itself and build up as the signal is transferred in sequence from the register's input to its output end with each stage of the register producing the same type of distortion which thus accumulates along the register. The resulting total distortion may be so great that at the register's output end the signal is unusable, in particular when a sudden change, which recurs periodically, is imposed.

According to the invention, an inverter 8 is connected midway in the register between input and output stages 4 and 6. At this point, the inverter serves to invert and to amplify if and as necessary for matching purposes the half-formed total distortion characteristic existing at the output of the input stages 4. The inverted half-formed total distortion characteristic produced along with the inverted information signal is then transmitted through output stages 6 which introduce distortions in the signal in the same manner as did the input stages 4. Thus, the inverted distortion characteristic in the signal from inverter 8 combines with and nullifies the corresponding substantially identical distortion characteristic introduced as the signal passes through the output stages 6. In this manner, at the output of the register, one may obtain the information signal in an essentially undistorted although inverted state.

Figure 2:
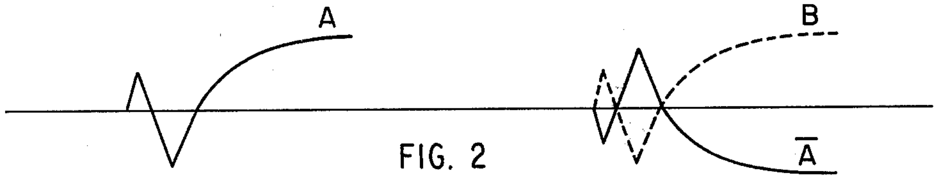
FIG. 2 shows illustrative characteristic signal distortions which may occur within the embodiment of FIG. 1.

FIG. 2 shows illustrative signal distortions which may occur where indicated within the embodiment of FIG. 1. Curve A in FIG. 2 represents the distortion characteristic introduced into the information signal by the input half of the register's stages. This distortion is inverted by the inverter 8 to provide A, also illustrated in FIG. 2. The output half 6 of the register's stages provide a signal distortion B substantially identical with the signal distortion caused by the input half of stages. Thus, as the analog signal passes through the register's output stages 6, the B signal distortion is introduced to combine with and nullify the A signal distortion characteristic provided at the output of the inverter 8. With these two distortion characteristics canceling each other, the output of the shift register 2 provides essentially only the information signal.

It can readily be appreciated that the invention is particularly useful where the processing components are formed as integrated circuits. In manufacturing this type of circuit, processing components illustrated in FIG. 1 can easily be arranged symmetrically on the substrate on both sides of the inverter to provide the circuits produced with uniform self-correcting capabilities.

Figure 3A:
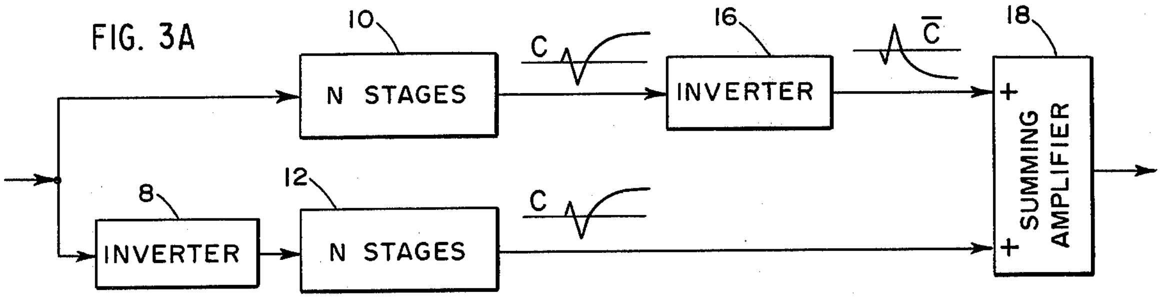
FIG. 3A shows a modified form of the embodiment of FIG. 3.
Figure 3:
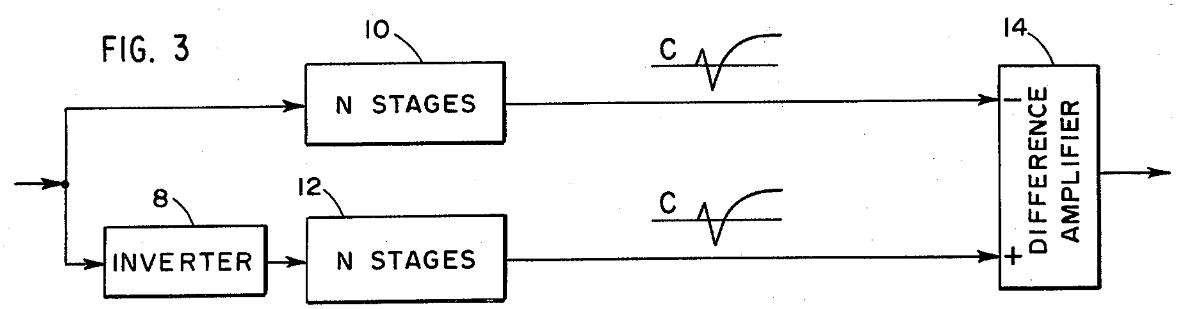
FIG. 3 shows another preferred embodiment of the invention.

FIG. 3 shows another preferred embodiment of the invention where two separate registers of N stages of the analog shift register designated 10 and 12 respectively are now required. The analog information signal and its inverse respectively are fed to the first and the second register in parallel and the outputs of the stages are connected to respective opposing inputs of a difference amplifier 14. In particular, the output of the first register 10 is connected to the inverting input of the difference amplifier while the output of the second register 12 is connected to the difference amplifier's non-inverting input. The accumulated distortion introduced into the signal by the first register designated 10 is substantially identical to the accumulated distortion produced in the signal by the second register 12. For example, each of these distortions may be as indicated by C in FIG. 3. Since these distortions are respectively applied to the inverting and non-inverting difference amplifier inputs, they nullify each other and do not appear at the output of the difference amplifier. In effect, the distortion introduced by the second register 12 is inverted and combined with the distortion introduced by the first register 10 so that they cancel.

To obtain the information signal at the output of the difference amplifier, an inverter 8 is provided at the input of the second register 12. Thus, the inverse of the information signal is applied to the non-inverting input of the difference amplifier along with the non-inverted information signal being applied to the amplifier's inverting input so that the difference amplifier provides an output which otherwise corresponds to, but is double the amplitude of, the processed analog information signal.

Thus, the embodiment shown in FIG. 3 not only serves to nullify distortion characteristics introduced into the signal by the switching stages, but also provides an output which has twice the amplitude of a single register. Also, the embodiment of FIG. 3 provides a much more correlated nullifying of the introduced distortions since the distortion characteristics produced by the two groups of register stages are introduced concurrently and are thereafter simultaneously applied to the difference amplifier for canceling.

FIG. 3A illustrates another embodiment of the invention which is a modification of the output implementation shown in FIG. 3. In FIG. 3A, a summing amplifier 18 having an inverter 16 at one of its inputs is substituted for the difference amplifier 14 of FIG. 3. The inverter 16 in FIG. 3A is connected to invert the distortion C introduced into the signal by the first register 10. Thus, the summing amplifier receives an inverted C distortion characteristic as well as the C distortion characteristic from the second register 12. These two distortions are thus combined and cancel each other.

Figure 4A:
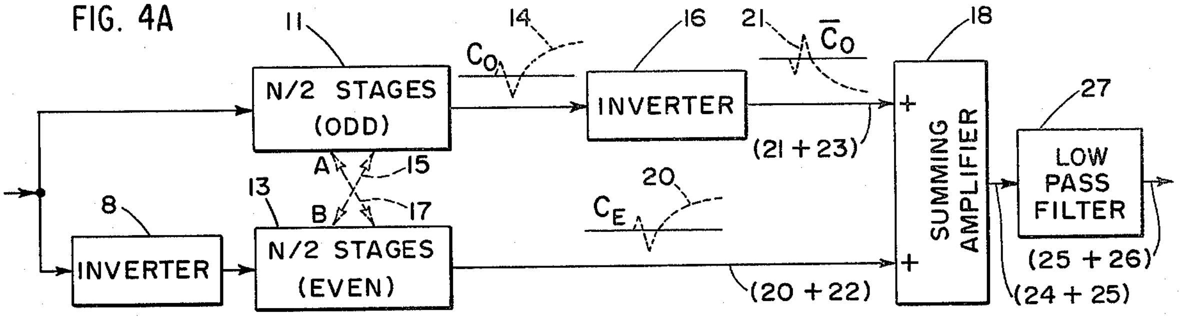
FIG. 4A shows a modified form of the embodiment of FIG. 4.
Figure 4:
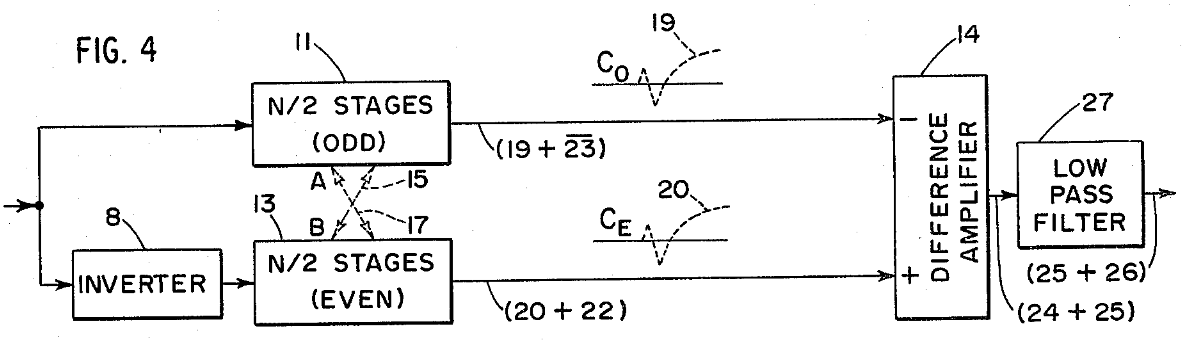
FIG. 4 shows still another preferred embodiment of the invention.
Figure 5:
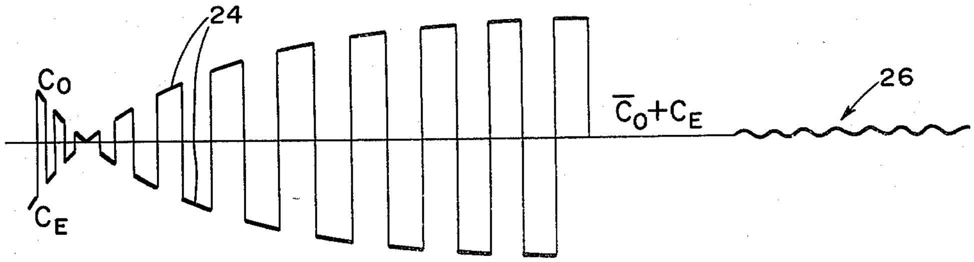
FIG. 5 shows illustrative characteristic signal distortions as processed which may occur within the embodiments of FIGS. 4 or 4A.
Figure 5A:
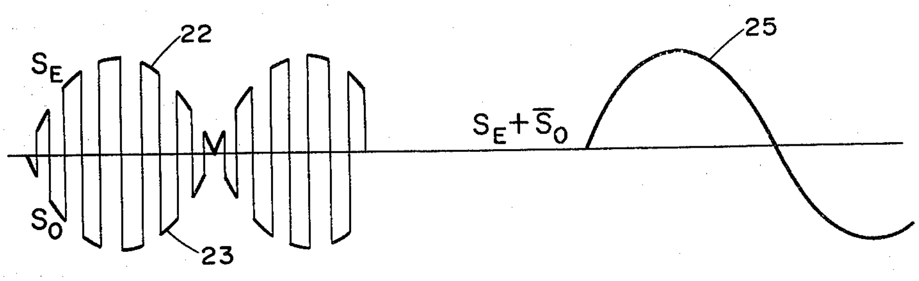
FIG. 5A shows illustrative output signal waveforms which may occur within the embodiment of FIGS. 4 or 4A.

FIG. 4 shows another preferred embodiment of the invention where the N stages of the analog shift register are evenly divided into its odd and even stages designated 11 and 13 respectively to form, in effect, two separate registers. The analog information signal and its inverse respectively are fed to the odd and even stages in parallel and the outputs of the stages are connected to respective opposing inputs of a difference amplifier 14. In particular, the output of the odd stages 11 is connected to the inverting input of the difference amplifier while the output of the even stages 13 is connected to the difference amplifier's non-inverting input. Out-of-phase transfer signals are applied to the transfer lines 15 and 17 such as to cause alternate transfer of signal through the odd and even stages 11 and 13 (rather than simultaneous transfer as for stages 10 and 12 in FIG. 3), and thus to present alternate output samples to the difference amplifier 14 accordingly (rather than continuous signals as in the prior examples). The accumulated distortion introduced into the signal by the odd stages designated 11 is substantially identical to, but out of phase with, the accumulated distortion produced in the signal by the even stages 13. For example, each of these distortions may be as indicated by ($C_o$) 19 and ($C_e$) 20 in FIG. 4 where $C_o$ is the odd stage and $C_e$ the even stage distortion waveform. Since these distortions are respectively applied to the inverting and non-inverting difference amplifier inputs, they effectively balance each other at the output of the difference amplifier as indicated by waveform 24 in FIG. 5. In effect, the distortion introduced by the odd stages 11 is inverted and combined with the distortion introduced by the even stages 13 so that as combined in wave 24 they may be canceled when passed through a suitable low-pass filter 27 as indicated by output waveform 26.

To obtain the information signal at the output of the difference amplifier, an inverter 8 is provided at the input of the even stages 13 of the register. Thus, inverse spaced samples 22 of the inverted information signal $S_e$ are applied to the non-inverting input of the difference amplifier along with non-inverted alternately spaces samples 23 $S_o$ of the information signal being applied to the amplifier's inverting input so that the difference amplifier provides a combined output 25 made up of $S_e + S_o$ which corresponds to the applied analog information signal.

Thus, the embodiment shown in FIG. 4 serves to nullify distortion characteristics introduced into the signal by the multiple stages. Of course, since the signal and its inverse are transmitted through the register alternately in parallel, the shift register may be advanced at only one-half the rate than would be necessary with a series connected register as shown in FIG. 1. Also, the embodiment of FIG. 3 provides a more closely related nullifying of the introduced distortions since the distortion characteristics produced by the two groups of register stages are alternately introduced and thereafter applied to the difference amplifier for canceling. Also, since with the embodiment of FIG. 4, the signal, in effect, need only pass through one-half of the number of stages than required with a serially connected register as shown in FIG. 1 or with the full signal registers of FIG. 3, the signal will only receive one-half of the distortions and transfer losses. Thus, only one-half of the distortions exist to be corrected or passed and signal degradation is thus able to be further reduced.

FIG. 4A illustrates another embodiment of the invention which is a modification of the embodiment shown in FIG. 4. In FIG. 4A, a summing amplifier 18 having an inverter 16 at one of its inputs is substituted for the difference amplifier 14 of FIG. 4. The inverter 16 in FIG. 4A is connected to invert the distortion $C_o$ 19 introduced into the signal by the odd stages 11 of the register. Thus, the summing amplifier receives an inverted $C_o$ 21 distortion characteristic as well as the $C_e$ 20 distortion characteristic from the even stages 13 of the register. These two distortions are thus combined 24 and balance each other and may be canceled at the output 26 of a suitable low-pass filter 27.

It will be appreciated that various changes and modifications in the above described preferred embodiments may be made without departing from the true spirit and scope of the invention. For example, other analog signal processing circuits can be similarly corrected including those which have as intermediate steps A/D-digital processing-D/A sequences.

I claim:

1. A signal processing circuit comprising: first and second multi-stage processing components through which said signal is serially transmitted, said first and second components each distorting said signal cumulatively through a plurality of stages in substantially the same characteristic manner; and, means interposed between said first and second components for inverting the output of said first processing component and applying the inverted output as the sole input to said second processing component to cancel the distortion introduced in said signal by said first processing component with the distortion introduced by said second processing component.

2. A signal processing circuit comprising: first and second processing components through which said signal and its inverse are respectively transmitted in parallel, said first and second components presenting corresponding portions of said signal and its inverse at their respective outputs, said corresponding portions having substantially identical distortion characteristics effected by transmission through said processing components; a summing circuit having an inverting and noninverting input for respectively receiving the outputs of said first and second processing components to substantially cancel the inverted and non-inverted distortion characteristics outputted from said summing circuit while additively combining said corresponding portions.

3. An analog signal processor comprising analog shift register means for transferring analog signals through a pair of analog shift registers each of said registers having a like plurality of serial analog shift stages, said stages introducing transfer signal components which degrade said analog signals;

means for supplying an analog signal and its inverse as the respective inputs of said registers; and means effectively differentially combining the outputs of said registers for producing an output processed analog signal having said transfer signal components substantially cancelled by the inverse combination of said components introduced by said pair of registers while additively combining said analog signals transferred through said registers.

4. An analog signal processor comprising:

analog shift register means for transferring sampled analog signals through a pair of analog shift registers, each of said registers having a like plurality of serial analog shift stages, said stages introducing transfer signal components which degrade said analog signals;

means for supplying an analog input signal direct to one register and inverted to the other register of said pair of registers; and means for inversely combining the outputs of said pair of registers to produce an output processed analog signal having said transfer signal components substantially cancelled while additively combining said analog signals transferred through said registers.

5. A processor according to claim 4 in which said analog shift registers process said direct and inverted analog signal in parallel and said means for inversely combining the outputs of said pair of registers inverts the output of said one register for combination with the direct output of said other register.

6. A processor according to claim 5 in which said means for inversely combining includes means for additively combining the magnitudes of said outputs to approximately double the magnitude of said output processed analog signal.

7. An analog signal processor comprising:

a pair of analog shift registers each having a like plurality of serial analog shift stages;

means for supplying an analog signal input direct to one register and inverted to the other register of said pair of registers;

means for applying out of phase clocking signals to said pair of registers to alternately direct and transfer inverted sampled values of said analog signal through said registers respectively, said registers introducing transfer signal components which are present with said sampled values; and means for inversely combining the outputs of said pair of registers to combine the alternate relatively inverted sampled value outputs as a replica of said analog signal and cancel said transfer signal components present in said outputs.

8. Apparatus according to claim 7 and including a low pass filter coupled to said last named means for passing said replica and blocking sampling rate transfer signal components.

9. A signal processing system comprising: first and second parallel storage channels for receiving and temporarily storing a signal, said first and second channels each distorting said signal in substantially the same characteristic manner; and means for inverting the signal input of one as well as the output of one of said storage channels to cancel the distortion introduced in said signal by said first storage channel with the distortion introduced by said second storage channel while additively combining the output signals from said channels.

* * * * *

UNITED STATES PATENT AND TRADEMARK OFFICE

CERTIFICATE OF CORRECTION

PATENT NO. : 3,906,384
DATED : September 16, 1975
INVENTOR(S) : Murray M. Schiffman It is certified that error appears in the above-identified patent and that said Letters Patent are hereby corrected as shown below:

Column 3, line 11, "A" should read -- $\bar{A}$ --;

line 17, "A" should read -- $\bar{A}$ --;

Column 4, line 13, "C" should read -- $\bar{C}$ --;

line 61, "$S_O$" should read -- $\bar{S}_O$ --;

Column 5, line 24, "$C_O$" should read -- $\bar{C}_O$ --.

Signed and Sealed this

Thirtieth Day of November 1976

[SEAL]

*Attest:*

RUTH C. MASON
*Attesting Officer*

C. MARSHALL DANN
*Commissioner of Patents and Trademarks*